United States Patent [19]

Sasoka et al.

[11] Patent Number: 5,430,821
[45] Date of Patent: Jul. 4, 1995

[54] PROTECTIVE STRUCTURE FOR AN OPTICAL FIBER COUPLER AND METHOD FOR PROTECTING THE SAME

[75] Inventors: Eisuke Sasoka; Hiroshi Suganuma; Tomoyuki Hattori; Hiroaki Takimoto, all of Yokohama, Japan

[73] Assignee: Soei International Patent Firm, Osaka, Japan

[21] Appl. No.: 184,061

[22] Filed: Jan. 21, 1994

[30] Foreign Application Priority Data

Jan. 21, 1993 [JP] Japan .................. 5-008375

[51] Int. Cl.[6] .......... G02B 6/24; B65H 69/02; C03B 23/20
[52] U.S. Cl. .................. 385/99; 385/42; 385/43; 385/51; 385/95; 385/96; 156/158; 65/406; 65/410; 65/411
[58] Field of Search .......... 385/14, 27, 28, 30, 385/31, 39, 41, 42, 43, 46, 48, 50, 51, 95, 96, 97, 98, 99; 156/60, 158, 161, 166; 65/406, 408, 410, 411

[56] References Cited

U.S. PATENT DOCUMENTS

| 4,772,085 | 9/1988 | Moore et al. | 385/43 X |
| 4,801,185 | 1/1989 | Bricheno | 385/43 X |
| 4,906,068 | 3/1990 | Olson et al. | 385/43 X |
| 5,141,545 | 8/1992 | Grigsby | 385/99 X |
| 5,179,603 | 1/1993 | Hall et al. | 385/24 |
| 5,208,883 | 5/1993 | Hattori et al. | 385/43 |
| 5,247,598 | 9/1993 | Takimoto et al. | 385/99 |
| 5,261,018 | 11/1993 | Suganuma et al. | 385/51 |
| 5,263,104 | 11/1993 | Anjan et al. | 385/51 |
| 5,293,440 | 3/1994 | Miles et al. | 385/51 |
| 5,325,450 | 6/1994 | Suganuma et al. | 385/39 |
| 5,367,591 | 11/1994 | Seike et al. | 385/51 |

FOREIGN PATENT DOCUMENTS

| 0357429 | 3/1990 | European Pat. Off. | 385/99 X |
| 0501297 | 9/1992 | European Pat. Off. | 385/99 X |
| 3407862 | 5/1985 | Germany | 385/99 X |
| 3714525 | 11/1988 | Germany | 385/99 X |
| 62-102206 | 5/1987 | Japan | 385/99 X |
| 64-063907 | 3/1989 | Japan | 385/99 X |
| 01214806 | 8/1989 | Japan | 385/99 X |
| 82004328 | 12/1982 | WIPO | 385/42 X |

*Primary Examiner*—Brian Healy
*Attorney, Agent, or Firm*—Cushman Darby & Cushman

[57] ABSTRACT

The present relates to the protective structure for an optical fiber coupler made from bare fiber parts of a plurality of optical fibers therein, the bare fiber parts being formed by removing the coating of the plurality of optical fibers and comprises a case made of material having a coefficient of thermal expansion equivalent to optical fibers and having space for enclosing the optical fiber coupler, and fiber supporting portions, being arranged inside of the space of the case and being fused with the bare fiber parts.

17 Claims, 8 Drawing Sheets

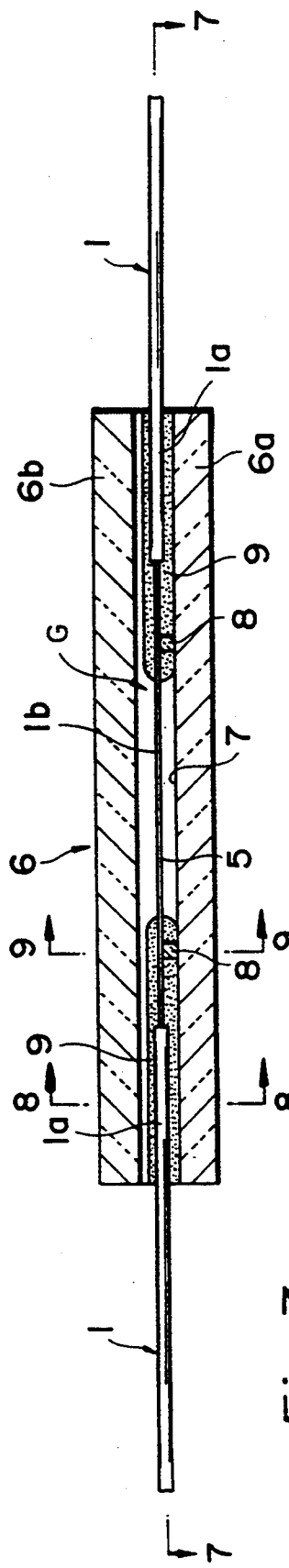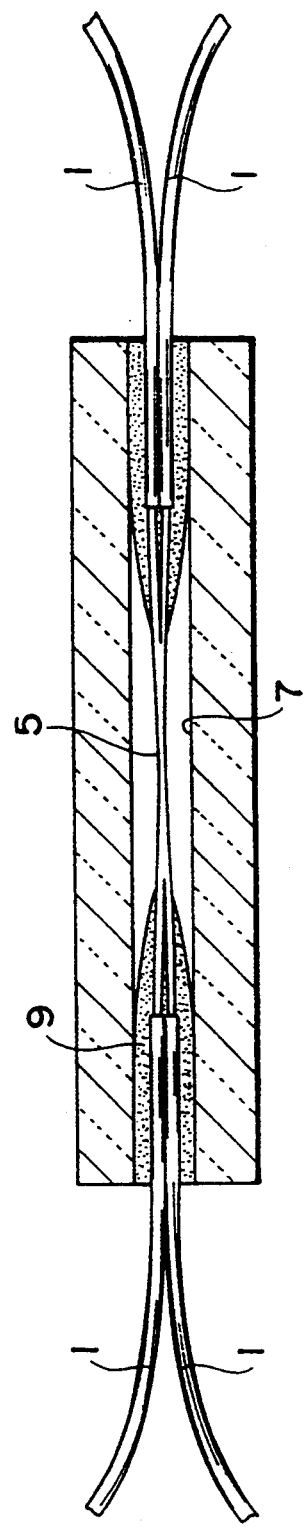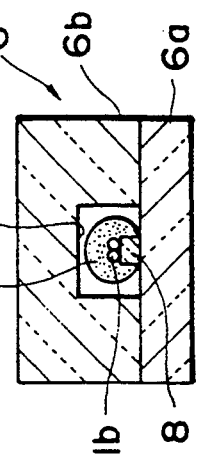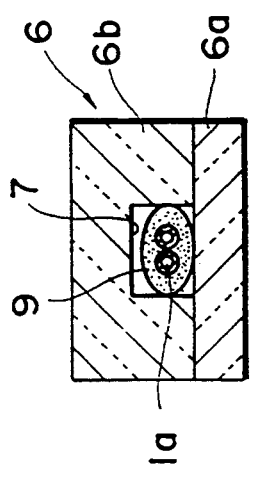
Fig. 6
Fig. 7
Fig. 9
Fig. 8

PROTECTIVE STRUCTURE FOR AN OPTICAL FIBER COUPLER AND METHOD FOR PROTECTING THE SAME

BACKGROUND OF THE INVENTION

1. Field of the Invention

The present invention relates to protective structure for an optical fiber coupler and method for protecting the same which splits and couples lights and is utilized in the field of optical communication or optical fiber sensors, etc.

2. Related Background Art

The optical fiber coupler is a device for splitting and coupling lights among a plurality of optical fibers, and is fabricated by contacting coating-removed parts of the plural optical fibers one another and thereafter fusing and elongating the coating-removed bare fiber parts by heating. The fused and elongated region is exposed as bare fiber and is the tapered region where the fiber diameter becomes gradually narrower as going to the center, so that it is required for such region to be protected by a case or other ways.

The conventional protective structure for the optical fiber coupler(Japanese Patent Application: Serial No. 314,350/1991) is shown in FIGS. 1 to 4. In each figure, the region of the coating portion 1a and the coating-removed bare fiber part 1b which is neither fused nor elongated, of an optical fiber 1 are fixed in a case body 3a with adhesive 2 and thereafter an opening part of the case body 3a is closed by a case lid 3b and sealed with adhesive. According to the conventional method, when the coating portion 1a and the bare fiber part 1b of the optical fiber 1 are fixed in the case body 3a with the adhesive 2, the adhesive which has high hardness is used for the coating portion 1a and the bare fiber part 1b to coat the adhesive around the optical fiber in order to strengthen the fixation.

In the conventional protective structure, since the adhesive 2 having high hardness is coated to the circumference of the bare fiber part 1b, in accordance with the change of the outer environment such as the temperature change, the adhesive 2 or the protective case 3 is frequently expanded and/or contracted, and due to this, uneven stress is added to the bare fiber part 1b. This stress results in occurring birefringence in the optical fiber 1 and changing polarization characteristic of the optical fiber coupler. Especially, in the optical fiber coupler using a polarization holding optical fiber, it is a problem that crosstalk, which is an important characteristic parameter of the optical fiber coupler, is degraded.

For the solution to the aforesaid problems, one might consider to lower the hardness of adhesive. However, if the hardness of adhesive is lowered, the stress impressed to the bare fiber part 1b can be lowered but the fixation of the bare fiber part 1b to the protective case 3 is insufficient, therefore it is a problem that characteristic of the optical fiber is fluctuated by vibration or other reasons.

SUMMARY OF THE INVENTION

It is an object of the present invention to provide protective structure for an optical fiber coupler and a method for protecting the same which can firmly fix the optical fiber coupler to a case and stress impressed to a bare fiber part is sharply lowered.

In order to achieve the above object, protective structure for an optical fiber coupler of the present invention, which protects a bare fiber part of a plurality of optical fibers, the bare fiber part being formed by removing the coating of the plurality of optical fibers, by storing and fixing the optical fiber coupler fabricated by fusing and elongating the bare fiber parts of a plurality of optical fibers in a case, wherein the case is made of glass material having a coefficient of thermal expansion equivalent to the optical fiber; and the bare fiber parts of the optical fiber coupler are directly fixed to the case thereby fusing thereonto.

It is preferred that an unfused and unelongated region of the bare fiber part is fused onto the case. Further, a projecting portion may be formed inside of the case, and the bare fiber part may be fused to the projecting portion.

A method is provided for protecting an optical fiber coupler of the present invention, which protects bare fiber parts of a plurality of optical fibers, by storing and fixing the optical fiber coupler fabricated by fusing and elongating the bare fiber parts of a plurality of optical fibers in a case. The method for protecting the optical fiber coupler comprises a step of fusing the bare fiber parts onto the case made of glass material having a coefficient of thermal expansion equivalent to the optical fiber by arc discharge; and a step of coating the fused region of the bare fiber part to said case.

According to the present invention, the bare fiber part of the optical fiber coupler is fused directly onto the case, so that a hardness of a fixed region is relatively high compared to an adhesive and any change in characteristics due to vibration, etc. is not generated. Further, since the fused region of the optical fiber to the case has the coefficient of thermal expansion equivalent to these two, the stress occurrence due to the change of temperature is little and change in polarization characteristic is hardly generated. Moreover, when the optical fiber is fused onto the case through the projecting portion, owing to the projection of the projecting portion, partial fusing only to a necessary area can be easily performed.

The resin material covering a portion of the bare fiber 1b is the resin material whose hardness is relatively low. Thus, the stress to be produced in the optical fiber is adequately small and the variation in the polarization characteristic of the optical fiber can be ignorable.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is a cross sectional view cut off parallel to the optical fiber, FIG. 7 is a cross sectional view cut off in the plane 7—7 of FIG. 6, FIG. 8 is a cross sectional view cut off in the plane 8—8 of FIG. 6, FIG. 9 is a cross sectional view cut off in the plane 9—9 of FIG. 6.

DESCRIPTION OF THE PREFERRED EMBODIMENTS

Figure 1:
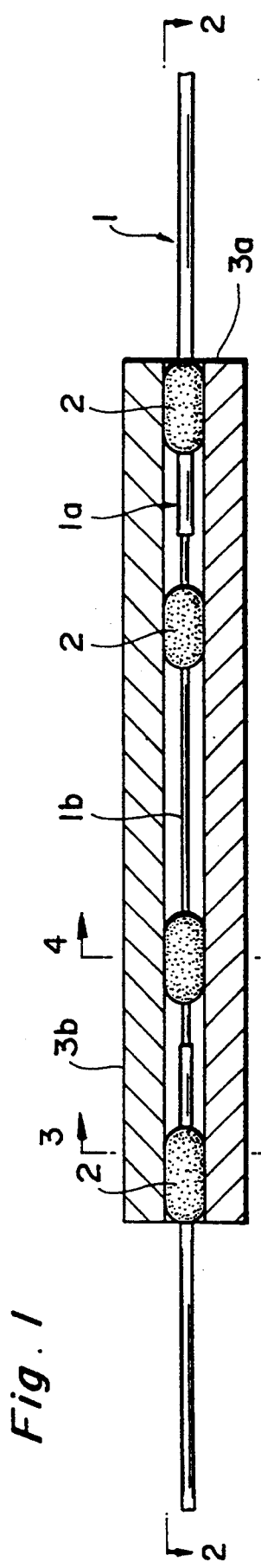
FIG. 1 is an explanatory view showing a conventional protective structure.
Figure 2:
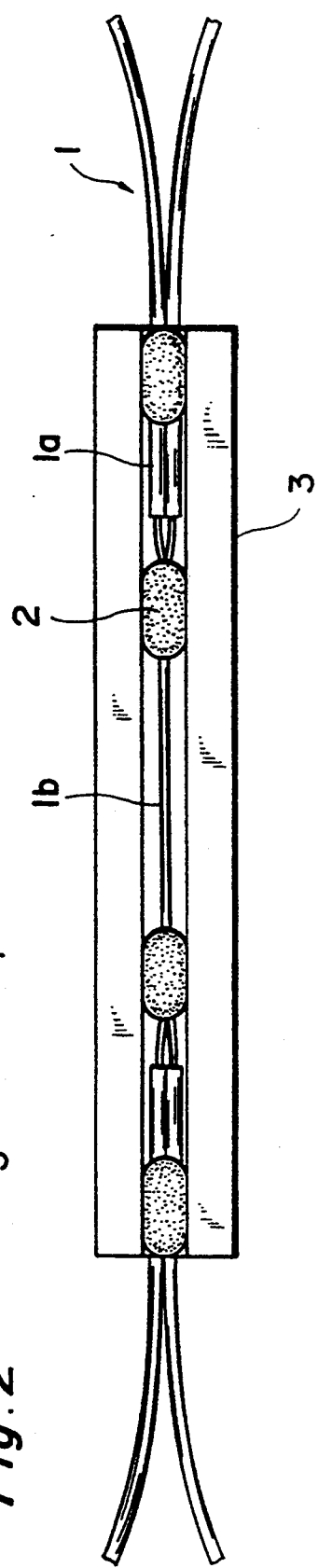
FIG. 2 is a cross sectional view taken along the line 2—2 of FIG. 1.
Figure 3:
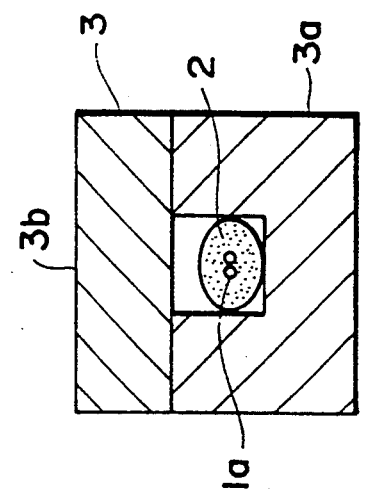
FIG. 3 is a cross sectional view cut off in the plane 3—3 of FIG. 2.
Figure 4:
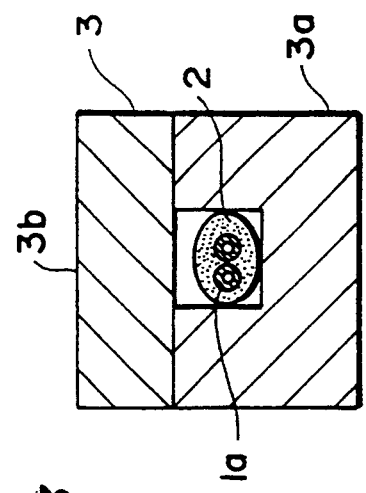
FIG. 4 is a cross sectional view cut off in the plane 4—4 of FIG. 1.
Figure 5:
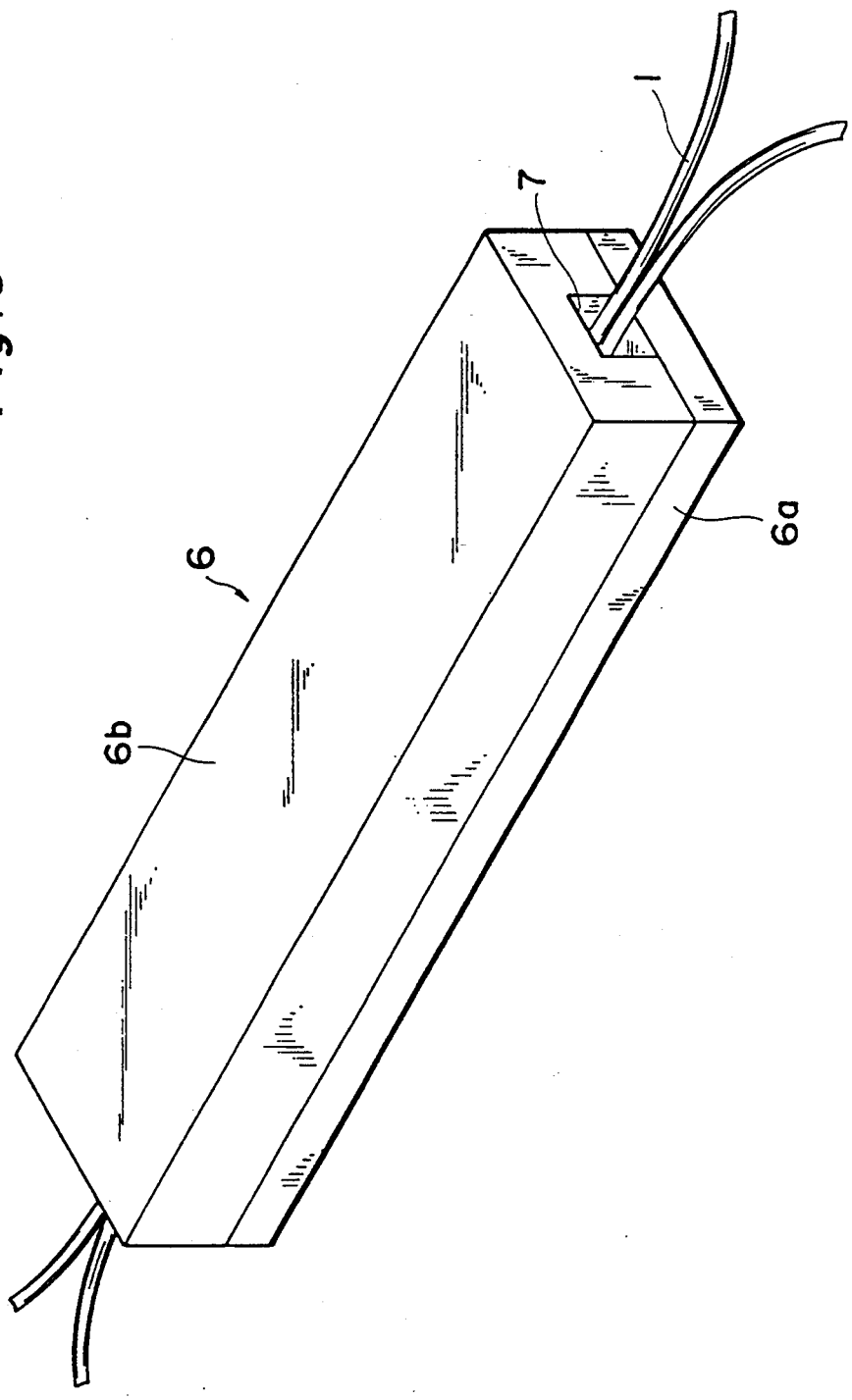
FIG. 5 is a perspective view according to one embodiment of the present invention.

The embodiments of the present invention will be described hereunder with reference to the accompanying drawings. The same devices are represented by the same reference numerals.

FIGS. 5 to 9 show first embodiment according to the present invention.

A fiber coupler G is fabricated by removing a partial portion of coating parts 1a of a plurality of optical fibers 1 to expose and form bare fiber parts 1b, thereafter contacting closely the bare fiber parts 1b to one another, and fusing and elongating the contacted bare fiber portion 1b. The fused and elongated region of the optical fiber is transformed into the shape of a bi-conical, the center of which has the smallest diameter, that is, a tapered portion 5. The tapered portion 5 has the small diameter and is weak, so that the optical fiber 1 is stored in a protective case for its protection (See FIG. 6).

The protective case 6 comprises a case substrate 6a made of silica glass having a coefficient of thermal expansion equivalent to the optical fiber, and a case lid 6b to be placed on an upper surface of the case substrate 6a. For the material for case 6, any materials that have a coefficient of thermal expansion equivalent to the optical fiber and are capable of being fused onto the optical fiber may be used. Thus, it is not limited to silica glass. For example, the material which has a coefficient of thermal expansion of $2 \times 10^{-7}$ such as crystallized glass may be used for this purpose. The case lid 6b has a substantially "U" shaped cross section which is perpendicular to the longitudinal direction of the optical fiber, wherein a groove 7 for storing the optical fiber coupler G is formed. Further, fiber supporting structure or a projecting portion 8 is placed on the upper plane of the case substrate 6a. The projecting portion 8 is as shown in FIG. 9, placed on the upper surface of the case substrate 6a so that it is positioned within the groove 7 of the case lid 6b. Moreover, the projecting portions 8 are as shown in FIG. 6, placed for supporting the unfused and unelongated portion of the bare fiber part 1b at two points where both edge of the bare fiber part 1b when the optical fiber coupler G is stored in the groove 7. Then, the bare fiber part 1b is fixed directly onto the case substrate 6a by fusing the bare fiber part 1b to the projecting portion 8 without any adhesive.

In the tapered region of the optical fiber coupler G, most of light propagate as an evanescent wave from one core portion of the bare fiber to the other core portion of the bare fiber. As this tapered region is not supported by projecting portion 8 according to the embodiment, there is no bad effects in optical communication.

Further, in this embodiment, as shown in FIG. 6, a portion of the coating parts 1a of the optical fiber 1 is also stored in the groove 7 of the protective case 6, and this coating parts 1a and a part of the bare fiber part 1b fixed directly on the projecting portion 8 are coated by the adhesive 9 for protection. For instance, an ultraviolet curing resin is used as the adhesive 9. The ultraviolet curing resin material is desired to have the low hardness in order to suppress the occurrence of stress due to variation of temperature. In this embodiment, the ultraviolet curing resin material having the Young's modulus of 0.025 Kg/mm² is used.

Figure 10:
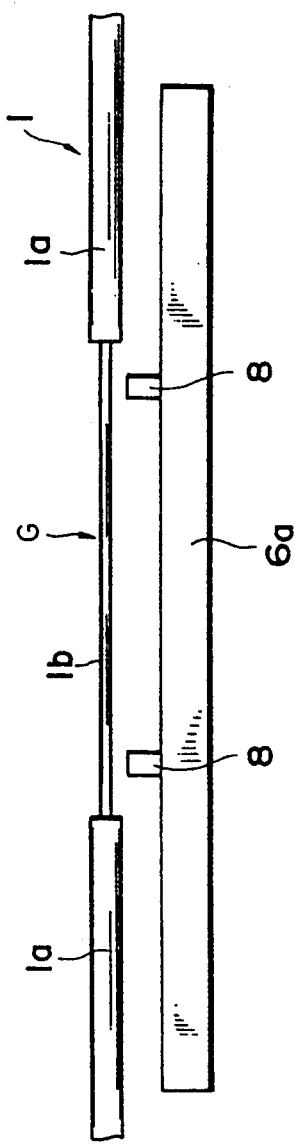
FIG. 10 is an explanatory view showing the process (a) of storing an optical fiber coupler in a case according to first embodiment of the present invention.
Figure 11:
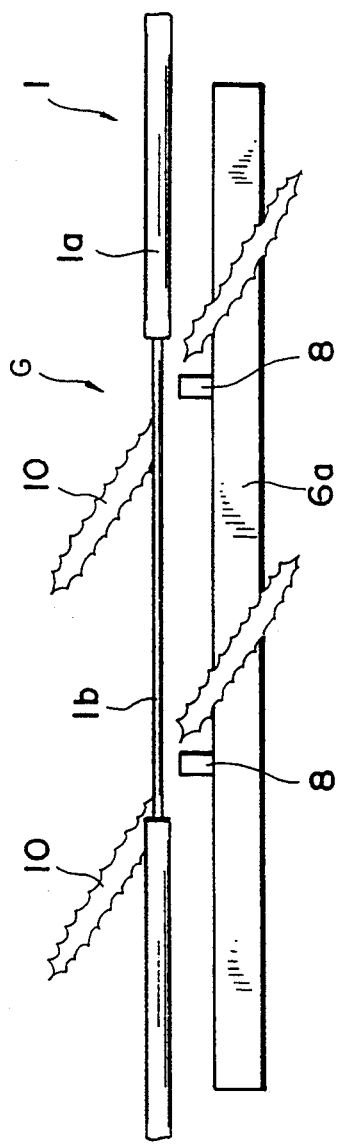
FIG. 11 is an explanatory view showing the process (b) of storing an optical fiber coupler in a case according to first embodiment of the present invention.
Figure 12:
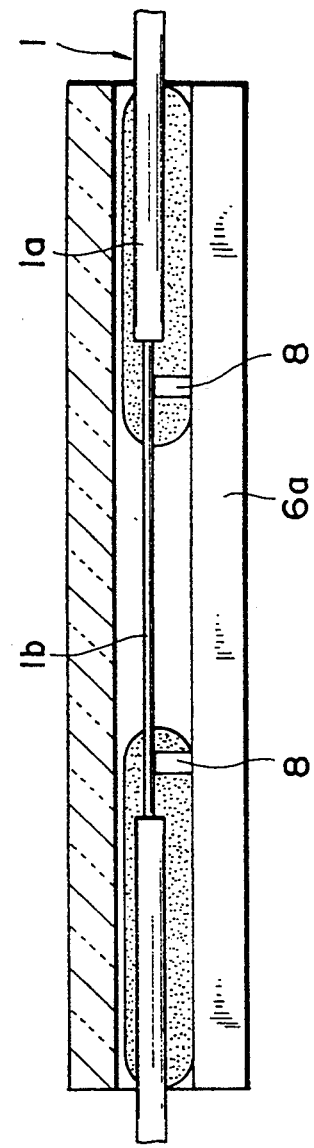
FIG. 12 is an explanatory view showing the process (c) of storing an optical fiber coupler in a case according to first embodiment of the present invention.

The method for protecting the optical fiber coupler according to the embodiment of the present invention will be explained in reference with FIGS. 10 to 12.

First, the polarization holding optical fiber coupler G with its base fiber port 1a fused and elongated is prepared. Next, the bare fiber part 1b of the optical fiber coupler G is approached to the projecting portion 8 of the case substrate 6a made of silica glass (See FIG. 10) such that the bare fiber part 1a is almost in contact with the projecting portion. Thereafter, an arc discharging electrode (not shown) is inserted perpendicular to the paper on which FIG. 11 is illustrated such that the electrode is placed between the unfused and unelongated region of the bare fiber part 1a and the projecting portion, and the arc discharge 10 is generated by applying high voltage to the electrode (See FIG. 11). When the arc discharge is generated, simultaneously the case substrate 6a is raised a little to fuse the bare fiber part 1b onto the projecting portion 8.

Thereafter, the ultraviolet curing resin having low hardness is coated on the fused region for protection. Further, in order to adhere the case substrate 6a to the case lid 6b, the same ultraviolet curing resin is coated on the upper surface of the case substrate 6a and then the case lid 6b is used to close the case substrate 6a (See FIG. 12). Finally, the resin coated to the fused region of the optical fiber coupler G for protection and the resin coated to the case substrate 6a for fixing the case lid 6b to the case substrate 6a are cured by irradiation of ultraviolet rays to the case overall, and then the process is completed. For fusing the bare fiber part 1b and the projecting portion 8, a gas burner may be used instead of the arc discharge.

The plural polarization holding optical fiber couplers were produced by the method as described above and the conventional method respectively. The temperature characteristics of crosstalk which is sensitive to the stress added to the bare fiber parts are evaluated to ensure the effect of the protective structure for the optical fiber according to the embodiment of the present invention. The evaluating method and results will be described below. The crosstalk of the optical fiber coupler produced by the way of the present invention and the conventional way are substantially equal.

Figure 13:
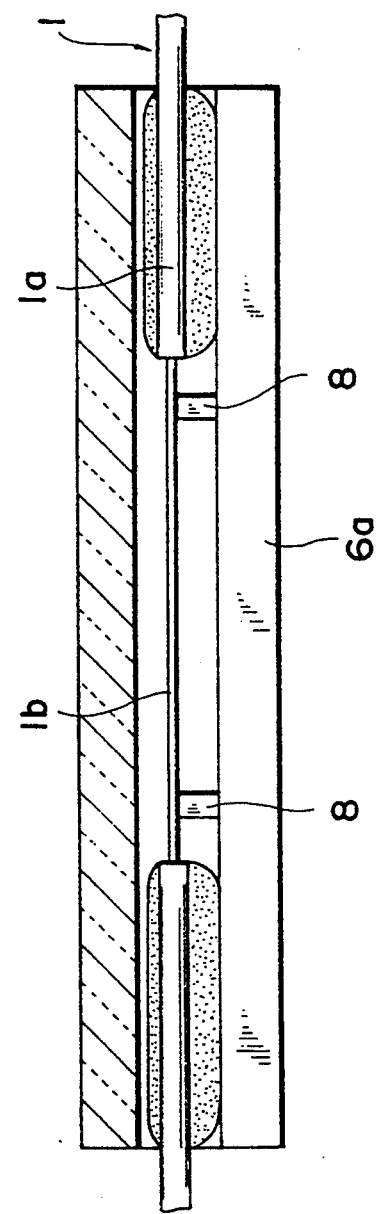
FIG. 13 is an explanatory view showing an optical fiber coupler stored in a case according to second embodiment of the present invention.

Next, the second embodiment of the present invention is explained in reference to FIG. 13.

The difference between the first embodiment and the second embodiment is that the adhesive 9 covers the coating parts 1a of the optical fiber 1, but does not cover the projecting portion 8. The bare fiber part 1b is fixed directly onto the case substrate 6a by fusing the bare fiber part 1b to the projecting portion 8 without any adhesive.

Figure 14:
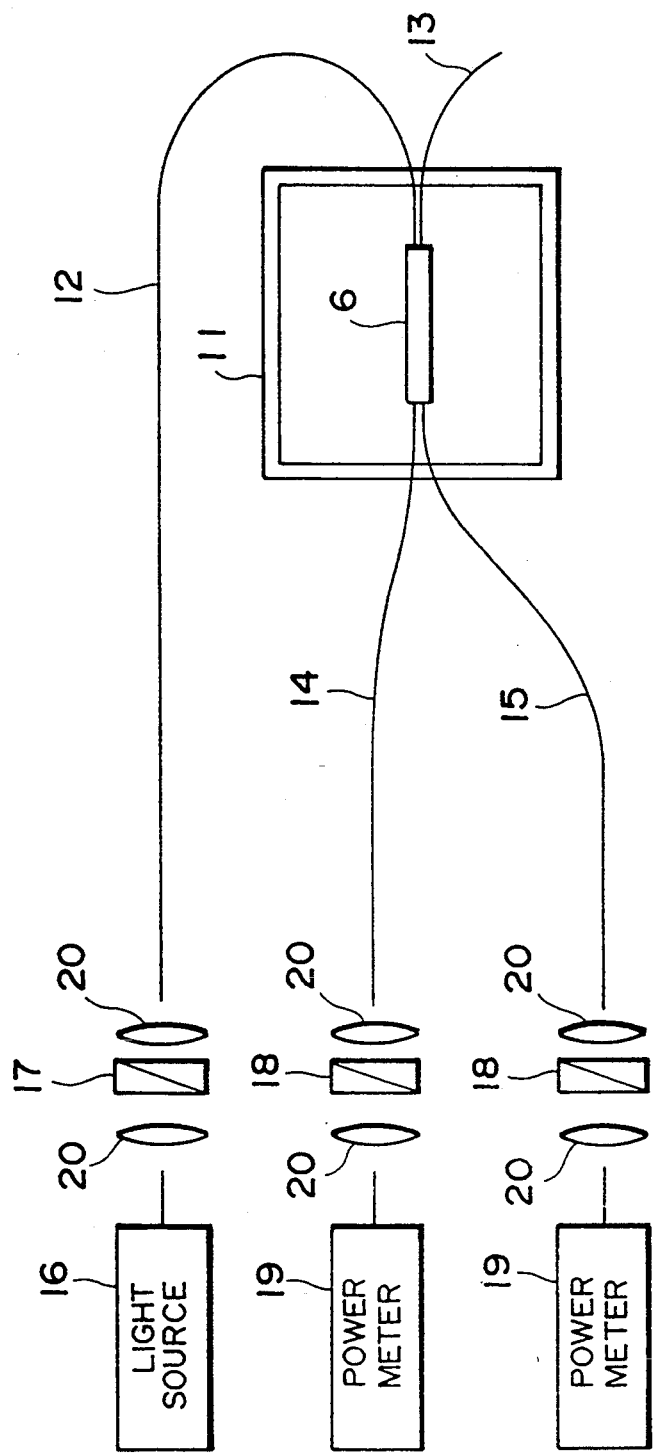
FIG. 14 is a schematic diagram showing a measuring system for ensuring the effect of protective structure for an optical fiber coupler according to first embodiment of the present invention.

FIG. 14 shows a schematic diagram showing the measuring system to ensure the effect of the protective structure according to the embodiment. The optical fiber coupler G to be measured is encaptured in a thermostatic container 11.

One end of a main fiber 12 on the incident side, one end of a branch fiber 13 on the incident side, one end of a main fiber 14 on the outgoing side, and one end of a branch fiber 15 on the outgoing side are led from the optical fiber coupler G stored in the thermostatic container 11 to the outside of the thermostatic container 11. Further, only X-polarized light of lights emitted from a light source 16 is incident to the end of the main fiber 12 on the incident side. Moreover, only a specific polarized component is extracted from the lights outputted from the end of the main fiber 14 on the output side and the end of the branch fiber 15 on the output side by a respective analyzer 18 and their intensities is measured by a respective power meter 19. Lenses 20 are placed before and after the polarizer 17 and the analyzer 18.

Using the above described measuring system, while temperature of the thermostatic container 11 is being changed from −40° C. to +70° C., the intensities of lights of X-polarized components and Y-polarized components from the end of the main fiber 14 on the outgoing side and the end of the branch fiber 15 on the outgoing side is measured and the temperature dependency of crosstalk is evaluated.

Next, the measurement results for the first embodiment and conventional protective structure will be explained in reference to FIGS. 15 and 16.

Figure 15:
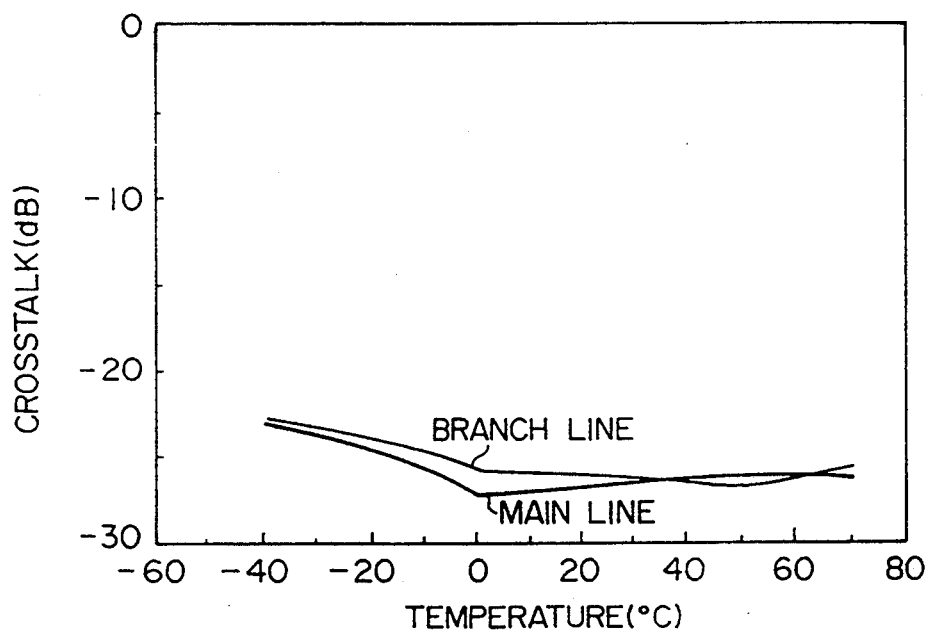
FIG. 15 is a graph showing measurement results in use of protective structure of an embodiment of the present invention.
Figure 16:
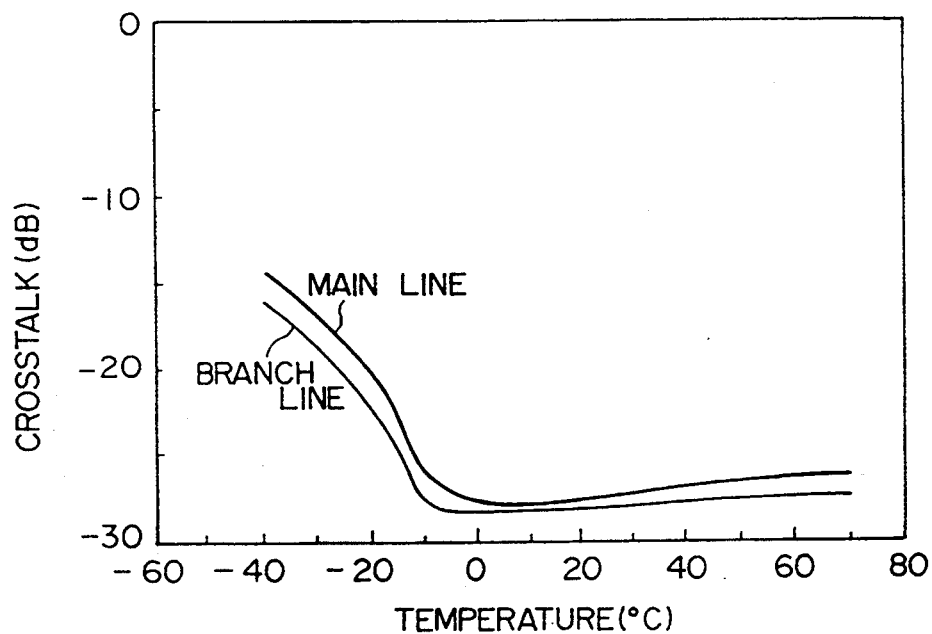
FIG. 16 is a graph showing measurement results in use of conventional protective structure.

According to the conventional protective structure, it is apparent that the crosstalk is degraded at lower temperature (See FIG. 16) but according to the protective structure of the present embodiment, the crosstalk is very stable (See FIG. 15).

Figure 17:
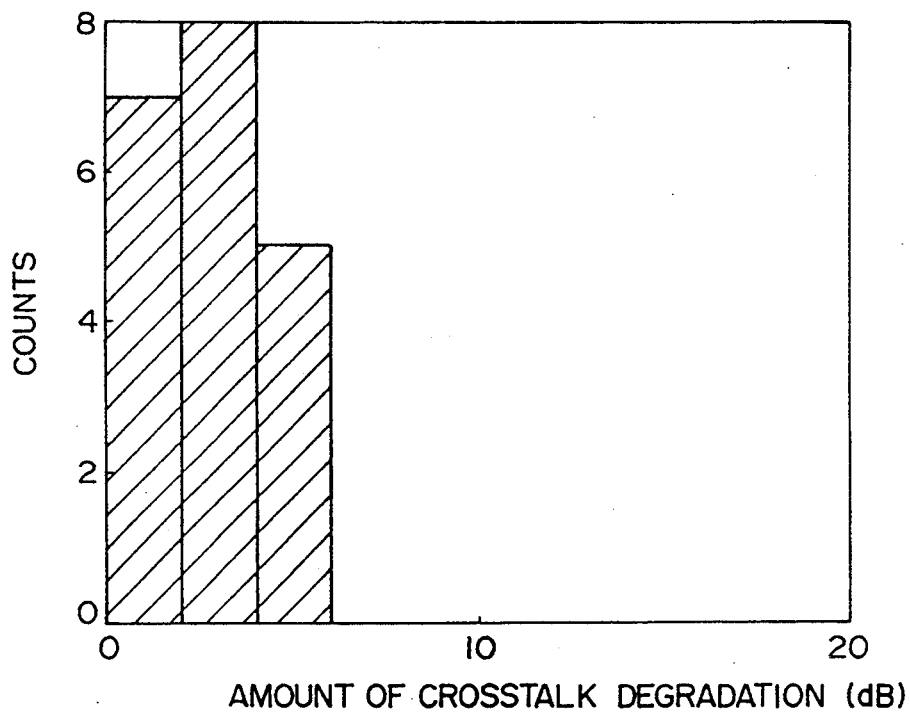
FIG. 17 is a graph of frequency distribution showing amount of crosstalk degradation at −40° C. in use of protective structure of an embodiment of the present invention.
Figure 18:
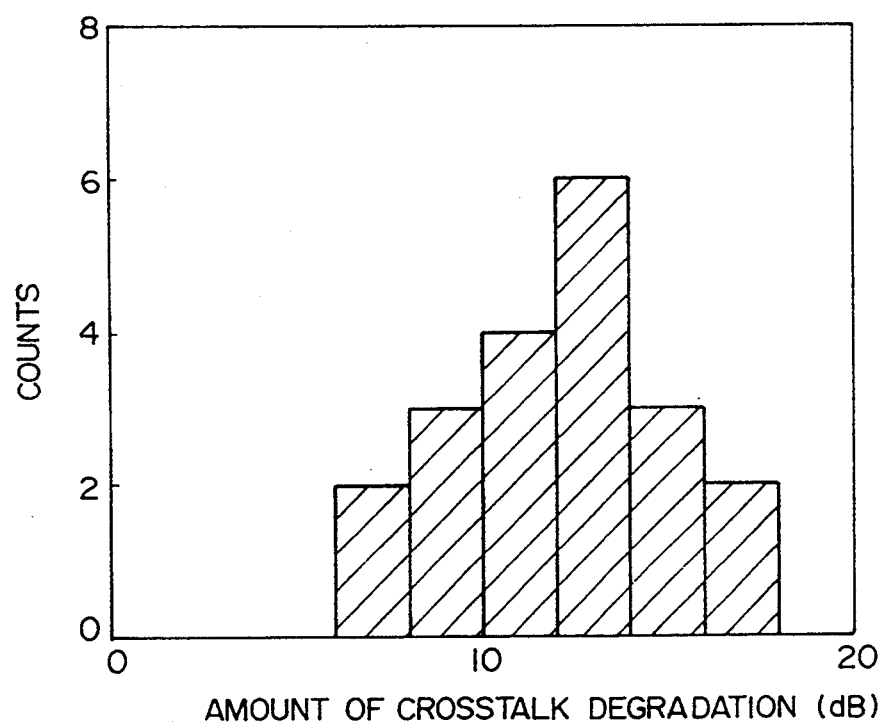
FIG. 18 is a graph of frequency distribution showing amount of crosstalk degradation at −40° C. in use of conventional protective structure.

Next, ten samples for each of the protective structure of the embodiment and the conventional protective structure were taken for measurement in the similar way to compare the degradation of crosstalk at −40° C. as shown in FIGS. 17 and 18. FIG. 17 shows measurement result in use of the protective structure according to the embodiment, and FIG. 18 shows measurement result in use of the conventional protective structure.

As shown in the frequency distribution of FIGS. 17, in the protective structure of the first embodiment, amount of crosstalk degradation is gathered at 0 to 6 dB. Whereas in the conventional protective structure, amount of crosstalk degradation is scattered at 6 to 18 dB. It is apparent from the graphs that amount of crosstalk degradation of the protective structure of the embodiment is quite small as compared to the amount of crosstalk degradation of the conventional protective structure. Further, after measuring temperature characteristics, vibration test is performed on the samples having the protective structure of the embodiment. In result, it was ensured that any change in characteristics or structure was not observed.

Thus, according to the protective structure of the first embodiment, polarization characteristic of the optical fiber coupler is very stable to the outer circumstance, so that it is extremely effective if the present invention is applied to an optical fiber coupler using polarization holding optical fibers which makes much of polarization characteristic.

The present invention is not limited to the embodiment as described above. For example, the kind, the number, the structure, of the optical fiber which is used in the optical fiber coupler, and material of the adhesive are not limited to the embodiment as described above.

According to the present invention, an optical fiber coupler can firmly be fixed to a protective case, and further stress impressed to a bare fiber part of the optical fiber coupler is dramatically lowered. Therefore, polarization characteristic of the optical fiber coupler is very stable to the outer environment, so that it is extremely effective if the present invention is applied to an optical fiber coupler using polarization holding optical fibers which makes much of polarization characteristic.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. Protective structure for an optical fiber coupler made from bare fiber parts of a plurality of optical fibers therein, said bare fiber parts being formed by removing the coating of the plurality of optical fibers, comprising:
   a case made of material having a coefficient of thermal expansion equivalent to said optical fibers and having space for enclosing said optical fiber coupler;
   fiber supporting structure disposed inside of the space of said case and fused with said bare fiber parts so as to support said bare fibers within said space.

2. Protective structure according to claim 1, wherein said fiber supporting structure supports portions of said bare fiber part being unfused and unelongated.

3. Protective structure according to claim 1, wherein said case is made of same material as optical fiber.

4. Protective structure according to claim 1, wherein said fiber supporting structure is a projecting portion formed in the space of said case.

5. Protective structure according to claim 1, wherein said fiber supporting structure is formed of rectangular-shaped projecting portion made of the material capable of being fused by arc discharge.

6. Protective structure according to claim 1, wherein said bare fiber portion is covered with adhesive at both ends in the space of said case, said adhesive having low hardness.

7. Protective structure according to claim 1, wherein said fiber supporting structure is covered with adhesive having low hardness.

8. Protective structure according to claim 1, wherein said case is made of material being different from that of said optical fiber but having same coefficient of thermal expansion as that of said optical fiber.

9. Protective structure according to claim 1, wherein said case and said optical fiber are formed of glass material.

10. Protective structure according to claim 1, wherein said case includes a case body and a case lid to form the space.

11. Protective structure according to claim 10, wherein said fiber supporting structure is mounted on said case body, a rectangular-shaped groove is formed on said case lid for enclosing said optical fiber, and said fiber supporting structure is positioned in the groove when said case lid is mounted on said case body.

12. Protective structure according to claim 1, wherein said optical fiber is polarization holding optical fiber.

13. A method for protecting an optical fiber coupler made from bare fiber portions of a plurality of optical fibers, said bare fiber parts being formed by removing the coating of the plurality of optical fibers, said bare fiber parts being disposed within a case, the case made of material having a coefficient of thermal expansion equivalent to the optical fibers, the method, comprising the steps of:

fusing said bare fiber parts to a portion of the case; and coating the fused region of the bare fiber parts by adhesion.

14. A method according to claim 13, wherein the case and the optical fiber are formed of glass material and the bare fiber are fused by arc discharge onto the case in the fusing step.

15. A method according to claim 13, wherein the case includes a case body and a case lid, a pair of rectangular-shaped projecting portions is formed of same material as that of optical fiber, the case lid has a groove to enclose the projecting portion in the fusing step.

16. The method according to claim 15, wherein the fused region formed in the fused step and the contacting region between the case body and the case lid are coated by ultraviolet curing resin, the resin applied for the fused region and the contacting region are cured by irradiation of ultraviolet rays to the case overall after the case lid in mounted on the case body.

17. The method according to claim 13, wherein said optical fiber is polarization holding optical fiber.

* * * * *

UNITED STATES PATENT AND TRADEMARK OFFICE
CERTIFICATE OF CORRECTION

PATENT NO. : 5,430,821
DATED : July 4, 1995
INVENTOR(S) : SASAOKA et al

It is certified that error appears in the above-indentified patent and that said Letters Patent is hereby corrected as shown below:

On the title page item [19], should read -- [19] SASAOKA et al--
On the title page item [75], should read--

Eisuke Sasaoka; Hiroshi Suganuma;
   Tomoyuki Hattori; Hiroaki Takimoto,
   all of Yokohama, Japan --

On the title page item [73], should read -- Sumitomo Electric Industries, Ltd. Osaka, Japan Signed and Sealed this Third Day of October, 1995

*Attest:*

BRUCE LEHMAN

*Attesting Officer*     *Commissioner of Patents and Trademarks*